US011883761B2

(12) United States Patent
Ng et al.

(10) Patent No.: US 11,883,761 B2
(45) Date of Patent: Jan. 30, 2024

(54) SYSTEM AND METHOD FOR INTERACTIVE DRONE EXPERIENCE

(71) Applicant: Universal City Studios LLC, Universal City, CA (US)

(72) Inventors: Melinda Ng, Orlando, FL (US); Anthony Melo, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 253 days.

(21) Appl. No.: 17/522,485

(22) Filed: Nov. 9, 2021

(65) Prior Publication Data

US 2022/0143523 A1 May 12, 2022

Related U.S. Application Data

(60) Provisional application No. 63/112,950, filed on Nov. 12, 2020.

(51) Int. Cl.
*A63H 27/00* (2006.01)
*A63H 33/22* (2006.01)
(Continued)

(52) U.S. Cl.
CPC .......... *A63H 33/22* (2013.01); *A63H 27/00* (2013.01); *B64C 39/024* (2013.01);
(Continued)

(58) Field of Classification Search
CPC .... A63H 27/00; B64U 10/80; B64U 2101/05; B64U 2201/20; G05D 1/0011
See application file for complete search history.

(56) References Cited

U.S. PATENT DOCUMENTS 9,429,398 B2    8/2016  Cortelyou et al.
9,433,870 B2    9/2016  Blum et al.
(Continued)

FOREIGN PATENT DOCUMENTS

KR      101617411       5/2016
KR      20180060403     6/2018

OTHER PUBLICATIONS

PCT/US2021/058987 International Search Report and Written Opinion dated Feb. 22, 2022.
(Continued)

*Primary Examiner* — John A Ricci
(74) *Attorney, Agent, or Firm* — Fletcher Yoder, PC

(57) ABSTRACT

An entertainment system includes a drone configured to be maneuvered across a plurality of zones, an interactive toy device configured to be actuated to cause a plurality of toy reactions, one or more processors, and one or more non-transitory, computer readable media having instructions stored thereon. The instructions, when executed by the one or more processors, cause the one or more processors to determine a correlation between the drone and the interactive toy device, where the correlation is based on a proximity between the drone and the interactive toy device and at least one of: a location of the drone within a zone of the plurality of zones, an additional location of the interactive toy device within the zone or an additional zone of the plurality of zones, a non-position based physical attribute of the drone, or an additional non-position based physical attribute of the interactive toy device. The instructions, when executed by the one or more processors, cause the one or more processors to activate, based on the correlation, a toy reaction of the plurality of toy reactions.

20 Claims, 7 Drawing Sheets

(51) Int. Cl.
  H04W 4/021 (2018.01)
  B64C 39/02 (2023.01)
  H04W 4/38 (2018.01)
  B64U 101/00 (2023.01)
  B64U 101/05 (2023.01)
(52) U.S. Cl.
  CPC ............ H04W 4/021 (2013.01); H04W 4/38 (2018.02); *A63H 2200/00* (2013.01); *B64U 2101/00* (2023.01); *B64U 2101/05* (2023.01); *B64U 2201/20* (2023.01)

(56) References Cited

U.S. PATENT DOCUMENTS

| | | | |
|---|---|---|---|
| 9,836,049 B1 | 12/2017 | Tu | |
| 9,878,258 B2* | 1/2018 | Matloff | A63H 27/12 |
| 10,198,955 B1 | 2/2019 | Boyd et al. | |
| 10,467,885 B2 | 11/2019 | Trundle et al. | |
| 10,496,100 B1 | 12/2019 | Reyne | |
| 11,194,407 B2* | 12/2021 | Parazynski | A63H 27/00 |
| 11,406,891 B2* | 8/2022 | Leal | A63F 7/2481 |
| 2010/0198514 A1 | 8/2010 | Miralles | |
| 2016/0250535 A1 | 9/2016 | Yatsko | |
| 2017/0160751 A1 | 6/2017 | Pierce et al. | |
| 2018/0008890 A1* | 1/2018 | Condon | A63F 13/00 |
| 2018/0373243 A1 | 12/2018 | Russell | |
| 2019/0025858 A1 | 1/2019 | Bar-Nahum et al. | |
| 2019/0220635 A1 | 7/2019 | Yeh et al. | |
| 2019/0302991 A1 | 10/2019 | Vyas et al. | |

OTHER PUBLICATIONS

Tom Bricker, "Paint the Night Parade at Disney California Adventure", Disney Tourist Blog, 2021 https://www.disneytouristblog.com/paint-night-parade/.

* cited by examiner

SYSTEM AND METHOD FOR INTERACTIVE DRONE EXPERIENCE

CROSS-REFERENCE TO RELATED APPLICATION

This application claims priority to and the benefit of U.S. Provisional Application No. 63/112,950, filed Nov. 12, 2020, and entitled "SYSTEM AND METHOD FOR INTERACTIVE DRONE EXPERIENCE," the disclosure of which is incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Theme or amusement parks have become increasingly popular and are created to provide guests with immersive experiences. For example, amusement parks may include entertainment systems, such as interactive attractions intended to improve these immersive guest experiences. Unfortunately, traditional interactive attractions may be technologically limited in ways that cause the immersive experiences to be redundant, generic, and simplistic. It is now recognized that improved interactive experiences for amusement parks are desirable.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an entertainment system includes a drone configured to be maneuvered across a plurality of zones, an interactive toy device configured to be actuated to cause a plurality of toy reactions, one or more processors, and one or more non-transitory, computer readable media having instructions stored thereon. The instructions, when executed by the one or more processors, cause the one or more processors to determine a correlation between the drone and the interactive toy device, where the correlation is based on a proximity between the drone and the interactive toy device and at least one of: a location of the drone within a zone of the plurality of zones, an additional location of the interactive toy device within the zone or an additional zone of the plurality of zones, a non-position based physical attribute of the drone, or an additional non-position based physical attribute of the interactive toy device. The instructions, when executed by the one or more processors, cause the one or more processors to activate, based on the correlation, a toy reaction of the plurality of toy reactions.

In an embodiment, an interactive drone system includes a drone and interactive toy devices. The system also includes a beacon having a transmitter with a signal transmission range. The beacon is configured to determine a presence of the drone. In response to determining the presence of the drone, the beacon is configured to transmit a signal over the signal transmission range and receivable by the interactive toy devices. A first interactive toy device of the interactive toy devices is configured to receive the signal and to actuate, in response to receiving the signal, to cause a first toy reaction of a plurality of toy reactions, where the first toy reaction is based on a correlation between the first interactive toy device and the drone.

In an embodiment, an entertainment system includes one or more processors and one or more non-transitory, computer readable media storing instructions thereon that, when executed by the one or more processors of the entertainment system, cause the one or more processors to perform various acts. The instructions cause the one or more processors to determine a first location of a first interactive toy device, determine a second location of a second interactive toy device, and determine a third location of a drone. The instructions cause the one or more processors to determine, based on the first location and the third location, a first proximity between the first interactive toy device and the drone, and actuate, in response to determining that the first proximity is less than a proximity threshold, the first interactive toy device to cause a first toy reaction of a first plurality of toy reactions, each toy reaction of the first plurality of toy reactions corresponding to a relation between a first non-position based physical attribute of the first interactive toy device and an additional non-position based physical attribute of the drone. The instructions also cause the one more processors to determine, based on the second location and the third location, a second proximity between the second interactive toy device and the drone, and actuate, in response to determining that the second proximity is less than the proximity threshold, the second interactive toy device to cause a second toy reaction of a second plurality of toy reactions. Each toy reaction of the second plurality of toy reactions corresponds to a relation between a second non-position based physical attribute of the second interactive toy device and the additional non-position based physical attribute of the drone.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7 is a schematic illustration of control decisions for a control assembly of the interactive drone system of FIG. 1, in accordance with an aspect of the present disclosure; and FIG. 8 is a schematic illustration of control decisions for a control assembly of the interactive drone system of FIG. 1, in accordance with an aspect of the present disclosure.

DETAILED DESCRIPTION

Figure 1:
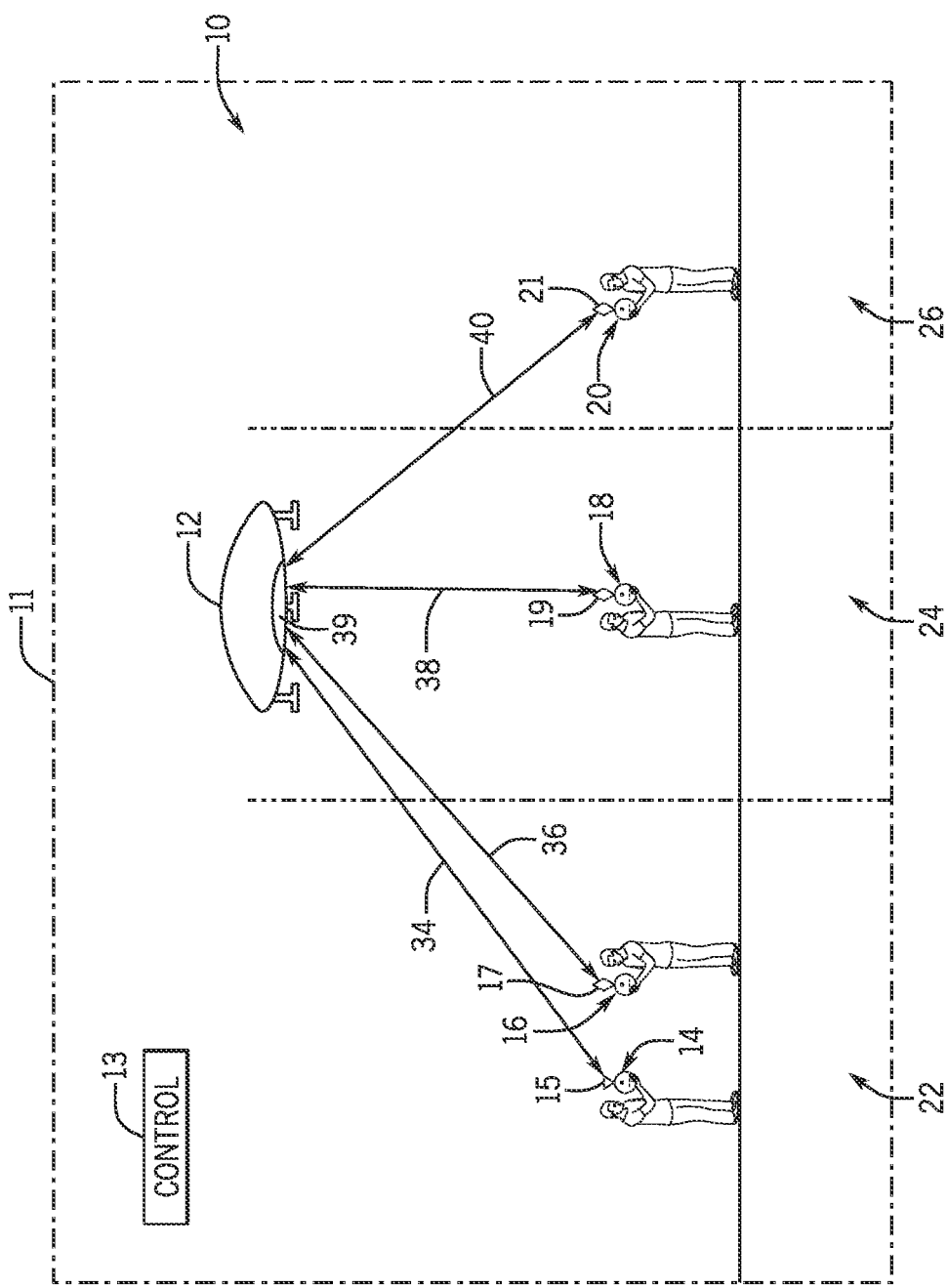
FIG. 1 is a schematic illustration of an interactive drone system for an amusement park, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to entertainment systems and methods (e.g., employed in an amusement park) that enable an interactive drone experience. More particularly, the present disclosure relates to an interactive drone system and method that causes reactions of interactive toy devices based on a correlation between the interactive toy devices and at least one drone maneuverable across various areas of an amusement park.

In accordance with the present disclosure, an interactive drone system includes at least one drone and a number of interactive toy devices. The interactive toy devices may be, for example, distributed to guests attending an amusement park. In certain embodiments, a number of different types of interactive toy devices may be distributed to guests attending the amusement park. For example, a first interactive toy device may include a first color, such as red, and a second interactive toy device may include a second color, such as blue. However, the interactive toy devices may be distinguished via additional or alternative characteristics, such as size or shape. In certain embodiments, the interactive toy devices may include different humanistic or animalistic features, such as faces. These humanistic or animalistic features may also be distinguishing characteristics of the interactive toy devices. For example, a first face of the first interactive toy device may differ from a second face of the second interactive toy device. Indeed, the first face of the first interactive toy device may include bushy eyebrows while the second face of the second interactive toy device may include thin eyebrows. The various interactive toy devices may additionally or alternatively correspond to characters in a story known by at least some of the guests attending the amusement park. For example, a first interactive toy device may correspond to a villain (e.g., antagonist) of the story while a second interactive toy device may correspond to a hero (e.g., protagonist) of the story. Additionally or alternatively, a first interactive toy device may correspond to a sidekick of the story while a second interactive toy device may correspond to a main character of the story. The interactive toy devices may include characteristics corresponding to these characters of the story. It should be understood that the above-described examples of distinguishing characteristics between various interactive toy devices is non-exclusive.

As previously mentioned, the various interactive toy devices may be distributed to various guests attending the amusement park. The interactive toy devices may be handheld, wearable, or otherwise sized and shaped such that the guests can move about the amusement park with the interactive toy devices on their persons. Accordingly, the various interactive toy devices may be distributed about zones of the amusement park as the various guests having the various interactive toy devices move throughout the zones of the amusement park. Some interactive toy devices may also be permanently stationed in various areas of the park.

The interactive drone system also includes at least one drone. The drone may be flown or otherwise maneuvered about the above-described zones of the amusement park. For example, the drone may be pre-programmed to fly along a pre-defined course spanning the various zones of the amusement park. In some embodiments, a path of the drone may be entirely or partially automated via a controller. Additionally or alternatively, the path of the drone may be at least partially dependent on feedback received by the controller. For example, feedback (e.g., sensor feedback) indicative of weather, guest distribution throughout the amusement park, and other factors may be received by the controller and considered by the controller as the controller automatically determines and controls movement of the drone. In still other embodiments, the drone may be entirely or partially maneuvered via a control device (e.g., remote control) operated manually, such as by an amusement park employee or a guest via a controller.

Each of the interactive toy devices may be configured to react in response to the drone coming within a pre-defined proximity of the interactive toy device (e.g., within the same zone as the interactive toy device). For example, sensors and a controller may be employed to determine a proximity between the drone and a first interactive toy device, and the first interactive toy device may be controlled to react when the proximity is less than a pre-defined proximity threshold. In some embodiments, the proximity threshold may correspond to a pre-defined distance between the interactive toy device and the drone, such as fifty feet. When the interactive toy device is positioned an actual distance away from the drone that is equal to or less than the pre-defined distance (e.g., the interactive toy device is fifty feet or less away from the drone), then the interactive toy device may be controlled to react. In other embodiments, the proximity threshold simply corresponds to common residence of the interactive toy device and the drone in a particular pre-defined zone of the amusement park. That is, the proximity threshold is met when the interactive toy device is in the same zone as the drone.

In the above-described embodiments, the particular type of reaction exhibited by the interactive toy device may be selected based on a correlation between the interactive toy device and the drone. The proximity between the drone and the interactive toy device may be considered one factor of the correlation between the drone and the interactive toy device, but other factors may also be considered in determining when and how an interactive toy device reacts. That is, the interactive toy device may be capable of multiple reactions, and a particular reaction of the multiple reactions may be caused in response to a particular correlation between the drone and the interactive toy device. Because the above-described proximity may trigger the reaction, the above-described proximity may be considered a part of the correlation between the first interactive device and the drone in accordance with the present disclosure.

It should be noted that "proximity" in accordance with the present disclosure refers to a closeness between the drone and the interactive toy device (e.g., based on a distance between the drone and the interactive toy device, or based on the drone and the first interactive toy device residing in the same zone). Proximity may be determined based on an actual distance between the toy and the drone being less than a pre-defined threshold distance, or proximity may be determined based on the toy and the drone occupying a common pre-defined zone.

Further, location-based features may also be considered in determining and triggering an interactive toy reaction. "Location" in accordance with the present disclosure may refer to the particular zone in which the interactive toy device resides, or a zone in which the drone resides. That is, "proximity" refers to a closeness between the drone and the interactive toy device regardless of location, whereas "location" refers to an actual location of the toy, the drone, or both regardless of "proximity."

For example, the first interactive toy device may be disposed in a first zone of the amusement park and may react a particular way while in the first zone. Indeed, as the drone comes within close proximity of the interactive toy device (e.g., as the drone and the interactive toy device are both resident in the first zone), the above-described proximity threshold may be met and the interactive toy device may exhibit a first reaction that corresponds to the first zone. If the first interactive toy device and the drone were to, for example, simultaneously occupy a second zone different than the first zone, the first interactive toy device may exhibit a second reaction corresponding to the second zone and different than the first reaction. That is, in both cases a proximity between the drone and the interactive toy device is determined and the reaction of the interactive toy device is triggered based on the proximity. The particular type of reaction exhibited by the interactive toy device in this case depends at least in part on the particular location (e.g., the first zone, the second zone, etc.) in which the interactive toy device resides. In embodiments whereby proximity is determined based on a pre-defined threshold distance (e.g., as opposed to the toy and drone residing in the same zone), the particular reaction exhibited by the toy may depend on a zone in which the toy itself resides, a zone in which the drone itself resides, or a combination thereof.

Further to the description above, if a second interactive toy device and the first interactive toy device reside in the first zone as the drone comes into close proximity with both, the second interactive toy device may react differently than the first interactive toy device. In some embodiments, the first interactive toy device and the second interactive toy device may react differently at a single or similar moment in time. Indeed, other non-position based physical characteristics or attributes (e.g., aesthetic characteristics), such as the above-described color, size, shape, or face of the interactive toy device, may dictate the type of reaction exhibited by the interactive toy device. For example, the first interactive toy device in the first zone may correspond to a hero of a story and may react with happiness as the drone comes in close proximity with the first interactive toy devices, whereas the second interactive toy device in the first zone may correspond to a villain of the story and may react with anger as the drone comes in close proximity with the second interactive toy device. The reactions may include, for example, a change in color, size, or shape, or a change in facial expression (e.g., smiling, frowning, yawning, yelling, crying, screaming, and the like), among other possible reactions. It should be noted that "position" in accordance with the present disclosure may refer broadly to both proximity and location. That is, reference to "non-position based physical characteristics" above and below may mean characteristics of the drone, the interactive toy device, or both involving size, shape, color, character, face, or some other aesthetic or functional feature. In other words, "non-position based physical characteristics" excludes "proximity" characteristics and "location" characteristics.

In certain embodiments, multiple drones may also be employed. Further, the drones may differ in type (e.g., based on size, shape, color, facial characteristics, or character in a story). Thus, the correlation between the drone(s) and the interactive toy device(s) that dictate the type of reaction exhibited by the interactive toy device(s) may depend on physical attributes of the drone(s), such as size, shape, color, character, or face. For example, an interactive toy device having a first color (e.g., red) may react to a first drone having a second color (e.g., blue) differently that it would react to a second drone having a third color (e.g., green).

Depending on the embodiment, non-position based physical characteristics of the interactive toy devices, the drone, or any combination thereof may be detected or determined in a number of ways. For example, the interactive toy device may include a physical identifier, such as an RFID chip or tag, a bar code, a QR code, a physical mark, or some other identifier that corresponds to the type (e.g., size, shape, color, face, or character in a story) of the interactive toy device. Likewise, the drone may include a physical identifier that corresponds to the type (e.g., size, shape, color, face, or character in a story) of the drone. The controller may determine the non-position based physical characteristics of the correlation between the interactive toy device and the drone based on the above-described identifiers without having to detect each of the non-position based physical characteristics themselves, but instead merely by detecting the corresponding identifier, where characteristics corresponding to the identifier are stored in memory. However, in certain embodiments, detection hardware (e.g., sensors) may be employed to detect the non-position based physical characteristics of the drone and the interactive toy device. Additionally or alternatively, as previously described, detection hardware (e.g., sensors) may be employed to detect locations and/or proximity between the drone and the interactive toy device. Further, in certain embodiments, no detection of physical identifiers is required. For example, in certain embodiments, the reaction for a particular toy device may be determined based on proximity and/or location features.

As suggested in the description above, the correlation between a particular drone and a particular interactive toy device may include a number of factors, including proximity between the drone and the interactive toy device, a location of the interactive toy device, a location of the drone, a non-position based physical characteristic (e.g., aesthetic characteristic) of the interactive toy device, a non-position based physical characteristic (e.g., aesthetic characteristic) of the drone, etc. Each correlation may include a corresponding reaction of the interactive toy device at issue. By employing the above-described features in the disclosed interactive drone system, unique, immersive, interactive guest experiences can be created. That is, a guest may partake in the attraction multiple times and may receive a different experience each time (e.g., by way of occupying different zones of the park, by encountering different types of drones in the park, by having different types of interactive toy devices, etc.). These and other features are described in detail below with reference to the drawings.

FIG. 1 is a schematic illustration of an embodiment of an interactive drone system 10 for an amusement park 11. In certain instances in the present disclosure, the interactive drone system 10 may be referred to as an entertainment system. The interactive drone system 10 may include a drone 12, a control assembly 13, and interactive toy devices 14, 16, 18, 20. In some embodiments, as will be described in detail with reference to later drawings, a global controller is not employed, and instead control features (e.g., processors, memories) are distributed across various components of the system 10. In general, one or more processors and one or more memories may be employed by the presently disclosed system 10, and may be distributed amongst various components of the system 10 in accordance with the present disclosure. Various examples of control distribution will be provided with reference to later drawings.

As illustrated in FIG. 1, a number of different types of the interactive toy devices 14, 16, 18, 20 may be employed. For example, the interactive toy devices 16, 18, 20 may correspond to a first type having diamond shaped features 17, 19, 21 and the interactive toy device 14 may correspond to a second type having a triangular shaped feature 15. As previously described, the interactive toy devices 14, 16, 18, 20 may include other distinguishing characteristics, such as size, color, shape, character in a story, or facial features. The diamond shaped features 17, 19, 21 and the triangular shaped feature 15 are examples and representative of any number of different characteristics (e.g., color, team affiliation, shape, character type).

The amusement park 11 may be divided into various zones 22, 24, 26, as shown. The bounds of these zones 22, 24, 26 may be stored to a memory of the control assembly 13 (e.g., as part of a map of the amusement park 11 stored to the memory). Additionally or alternatively, the bounds of these zones 22, 24, 26 may be defined by various beacons configured to communicate with the toy devices 14, 16, 18, 20 and/or the drone 12. For example, each beacon associated with each zone may be configured to send and receive communications to and from the devices 14, 16, 18, 20 and/or the drone 12, and in some embodiments a range of each beacon may define the zones 22, 24, 26 of the park 11. That is, the various zones 22, 24, 26 may correspond to communication ranges for a signal emitter and/or detector of the beacon.

In the illustrated embodiment, the interactive toy devices 14, 16 reside in the first zone 22, the interactive toy device 18 resides in the second zone 24, and the interactive toy device 20 resides in the third zone 26. Further, in the illustrated embodiment, the drone 12 resides in the second zone 24. As previously noted, these zones 22, 24, 26 may correspond to an effective reach of wireless communications from a signal emitter and/or detector (e.g., beacon technology).

Each of the interactive toy devices 14, 16, 18, 20 may be configured to exhibit a reaction in response to a correlation between the respective interactive toy device 14, 16, 18, or 20 and the drone 12. That is, a first correlation may be determined by the control assembly 13 between the first interactive toy device 14 and the drone 12, a second correlation may be determined by the control assembly 13 between the second interactive toy device 16 and the drone 12, a third correlation may be determined by the control assembly 13 between the third interactive toy device 18 and the drone 12, and a fourth correlation may be determined by the control assembly 13 between the fourth interactive toy device 20 and the drone 12. The various correlations may be determined in view of position-based characteristics of the drone 12 and/or the interactive toy devices 14, 16, 18, 20, and in view of non-position based physical characteristics. The position-based characteristics may include independent or relative positions of the drone 12 and/or the interactive toy devices 14, 16, 18, 20. For example, the position-based characteristics may include the zone(s) 22, 24, 26 in which the drone 12 and/or the interactive toy device(s) 14, 16, 18, 20 reside. Further, the position-based characteristics may include a proximity between the drone 12 and the interactive toy devices 14, 16, 18, 20. That is, a first distance 34 between the first interactive toy device 14 and the drone 12, a second distance 36 between the second interactive toy device 16 and the drone 12, a third distance 38 between the third interactive toy device 18 and the drone 12, and a fourth distance 40 between the fourth interactive toy device 20 and the drone 12 may be determined by the control assembly 13 and may be one of multiple factors included in the above-described correlations between the drone 12 and the interactive toy devices 14, 16, 18, 20. In some embodiments, a reaction may be triggered based one of the above-described distances 34, 36, 38, or 40 being less than a pre-defined threshold distance. For example, in one embodiment, the third interactive toy device 18 may exhibit a reaction in response to the distance 38 being less than a pre-defined threshold distance or proximity (e.g., stored to the memory of the control assembly 13), where a type of the reaction depends on the correlation between the drone 12 and the third interactive toy device 18.

It should be noted that the distances 34, 36, 38, 40 may be measured from the corresponding interactive toy devices 14, 16, 18, 20 to a central point or region 39 (e.g., sensing region) of the drone 12. The distances 34, 36, 38, 40 may be determined by sensors of the control assembly 13, for example infrared (IR) sensors. In one embodiment, an IR transmitter may be disposed on each of the interactive toy devices 14, 16, 18, 20 and an IR receiver may be disposed on the drone 12, or vice versa. The IR transmitter and receiver pairs may be utilized to determine the various distances 34, 36, 38, 40. In certain embodiments, relative proximity may be additionally or alternatively determined based on the drone 12 residing in one of the zones 22, 24, 26 in which one or more of the interactive toy devices 14, 16, 18, 20 resides. For example, in the illustrated embodiment, the drone 12 and the third interactive toy device 18 reside in the second zone 24. Accordingly, a reaction of the third interactive toy device 18 may be triggered based on the relative proximity (e.g., the drone 12 and the third interactive toy device 18 residing in the same zone 24). In these and other embodiments, beacons corresponding to each of the zones 22, 24, 26 may be employed to detect presence of the interactive toy devices 14, 16, 18, 20 and/or the drone 12, and the beacons may be utilized to send communications to the interactive toy devices 14, 16, 18, 20 (e.g., to initiate a reaction of the interactive toy devices 14, 16, 18, 20) and/or the drone 12.

In addition to triggering a reaction in response to close proximity between the drone 12 and, for example, the third interactive toy device 18, the control assembly 13 may trigger a particular type of reaction dependent on a location of the drone 12 and/or the third interactive toy device 18. That is, the third interactive toy device 18 may exhibit a first reaction, such as a smile, when the drone 12 and the third interactive toy device 18 come in close proximity and the third interactive toy device 18 and/or the drone 12 are in the second zone 24. However, the third interactive toy device 18 may exhibit a second reaction, such as a frown, when the drone 12 and the third interactive toy device 18 come in close proximity and the third interactive toy device 18 and/or the drone 12 are in the third zone 26.

Further, the particular reaction of the interactive toy devices 14, 16, 18, 20 may depend on non-position based physical characteristics (e.g., aesthetic or functional characteristics) of the interactive toy devices 14, 16, 18, 20 and/or the drone 12. That is, the non-position based physical characteristics may be a part of the above-described correlation that dictates the type of reaction exhibited by the interactive toy devices 14, 16, 18, 20. For example, the interactive toy devices 16, 18, 20 having the diamond shaped features 17, 19, 21 may react to close proximity with the drone 12 in a first way (e.g., crying), whereas the interactive toy device 14 having the triangular shaped feature 15 may react to close proximity with the drone 12 in a second way (e.g., laughing). Thus, for example, toys associated with a hero team may exhibit happy traits when a drone associated with the hero team is nearby while the same toys may exhibit disgust when a drone associated with villains is nearby. Of course, the correlation dictating the type of reaction of the interactive toy devices 14, 16, 18, 20 may be multi-factor, including non-position based physical characteristics of the drone 12 at issue, non-position based physical characteristics of the interactive toy device 14, 16, 18, or 20 at issue, location of the drone 12 at issue, location of the interactive toy device 14, 16, 18, 20 at issue, and others.

Figure 2:
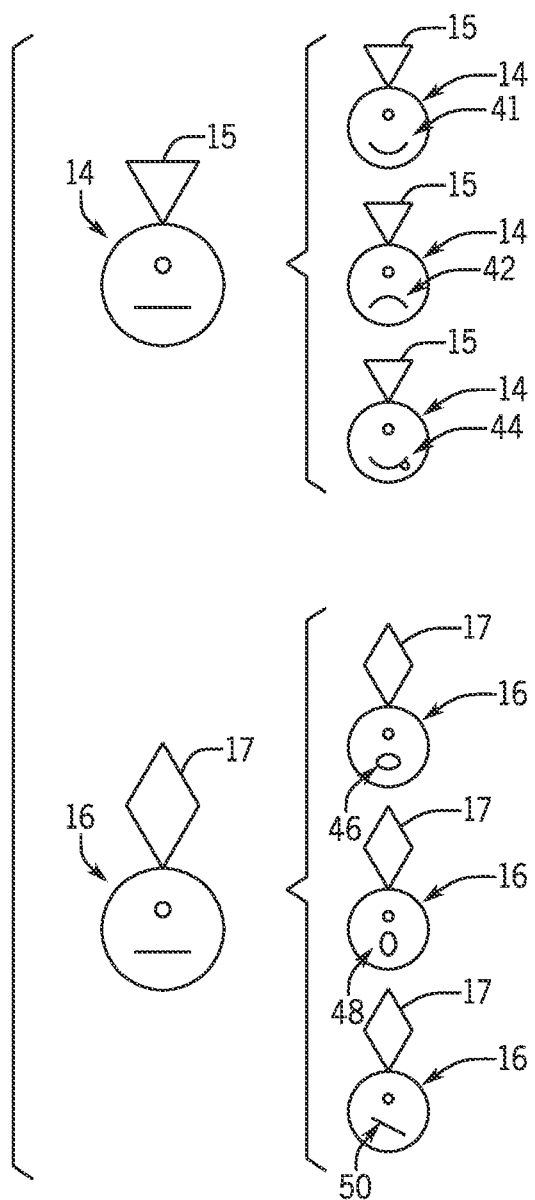
FIG. 2 is a schematic illustration of two interactive toy devices of the interactive drone system of FIG. 1, including several reactions of the two interactive toy devices, in accordance with an aspect of the present disclosure.

Various control schemes for employing the above-described effects will be illustrated in, and described with respect to, FIGS. 3-6. First, an embodiment of various possible reactions of the first and second interactive toy devices 14, 16 is illustrated in FIG. 2. As shown in FIG. 2, the first interactive toy device 14 having the triangular shaped feature 15 may be capable of being controlled to react with a smile reaction 41, a frowning reaction 42, and a playful reaction 44. The second interactive toy device 16 with the diamond shaped feature 17 may be capable of being controlled to react with a horizontal open mouth reaction 46, a vertical open mouth reaction 48, or a slanted mouth reaction 50. The reactions 41, 42, 44, 46, 48, 50 may be caused by actuating mechanical features of the toy devices 14, 16, or the reactions 41, 42, 44, 46, 48, 50 may be caused via a digital display on the interactive toy devices 14, 16. For example, the facial features of the first and second interactive toy devices 14, 16 may be displayed on a graphical user interface (GUI) of the first and second interactive toy devices 14, 16 and may be controlled digitally. It should be understood that the above-described reactions are non-limiting examples. Examples of other types of reactions may include mechanical or digitally presented reactions including making a noise, speaking a phrase, blinking eyes, flapping wings, wagging a tail, raising a hat, shaking a fist, nodding a head, and any other mechanical, audio or visual action.

Further, it should be understood that the first and second interactive toy devices 14 and 16, for example, may be capable of exhibiting the same types of reactions while still enabling the unique, immersive guest experiences described in the present disclosure. Indeed, the first and second interactive toy devices 14, 16 may include the same subset of available reactions, but may react differently in response to different correlations. For example, the first interactive toy device 14 and the second interactive toy device 16 may both be capable of the smile reaction 41, but the first interactive toy device 14 may exhibit the smile reaction 41 in response to a different correlation than that of the second interactive toy device 16. In one embodiment, the first interactive toy device 14 may exhibit the smile reaction 41 based on close proximity with the drone 12, based on the first interactive toy device 14 residing in the first zone 22 illustrated in FIG. 1, and based on the first interactive toy device 14 having the triangular shape feature 15, while the second interactive toy device 16 may exhibit the smile reaction 41 based on close proximity with the drone 12, based on the second interactive toy device 16 residing in the second zone 24 of FIG. 1, and based on the second interactive toy device 16 having the diamond shaped feature 17. Further, the first interactive toy device 14 may exhibit the frown reaction 42 of FIG. 2 in response to close proximity with the drone 12, the first interactive toy device 14 residing in the second zone 24, and the first interactive toy device 14 having the triangular shaped feature 15, and the second interactive toy device 16 may exhibit the frown reaction 42 of FIG. 2 in response to close proximity with the drone 12, the second interactive toy device 16 residing in the first zone 22, and the second interactive toy device 16 having the diamond shaped feature 17. In some embodiments and/or in response to certain correlations, the first interactive toy device 14 and the second interactive toy device 16 may exhibit different reactions at a single or similar moment in time.

Further, it should be noted that the correlation between the drone 12 and the various interactive toy devices 14, 16, 18, 20 may be a multi-factor correlation. For example, focusing again on FIG. 1, the zone 22, 24, 26 in which a particular one of the interactive toy devices 14, 16, 18, 20 resides may be a first factor of the multi-factor correlation, the zone 22, 24, 26 in which the drone 12 resides may be a second factor of the multi-factor correlation, a non-position based physical characteristic (e.g., the size, shape, color, or character) of the particular one of the interactive toy devices 14, 16, 18, 20 may be a third factor of the multi-factor correlation, and a non-position based physical characteristic of the drone 12 may be a fourth factor of the multi-factor correlation. Indeed, multiple drones (including the drone 12) may be employed, each drone having distinguishing non-position based physical characteristics (e.g., size, shape, color, face, character in a story). Of course, as previously described, a relative proximity between the drone 12 and the particular one of the interactive toy devices 14, 16, 18, 20 required in some embodiments to trigger a reaction may also be considered a part of the above-described multi-factor correlation. The relative proximity, as previously described, may be based on common residence in one of the zones 22, 24, 26, or on a proximity threshold distance exceeding a measured distance between the drone 12 and one of the interactive toy devices 14, 16, 18, 20.

Figure 4:
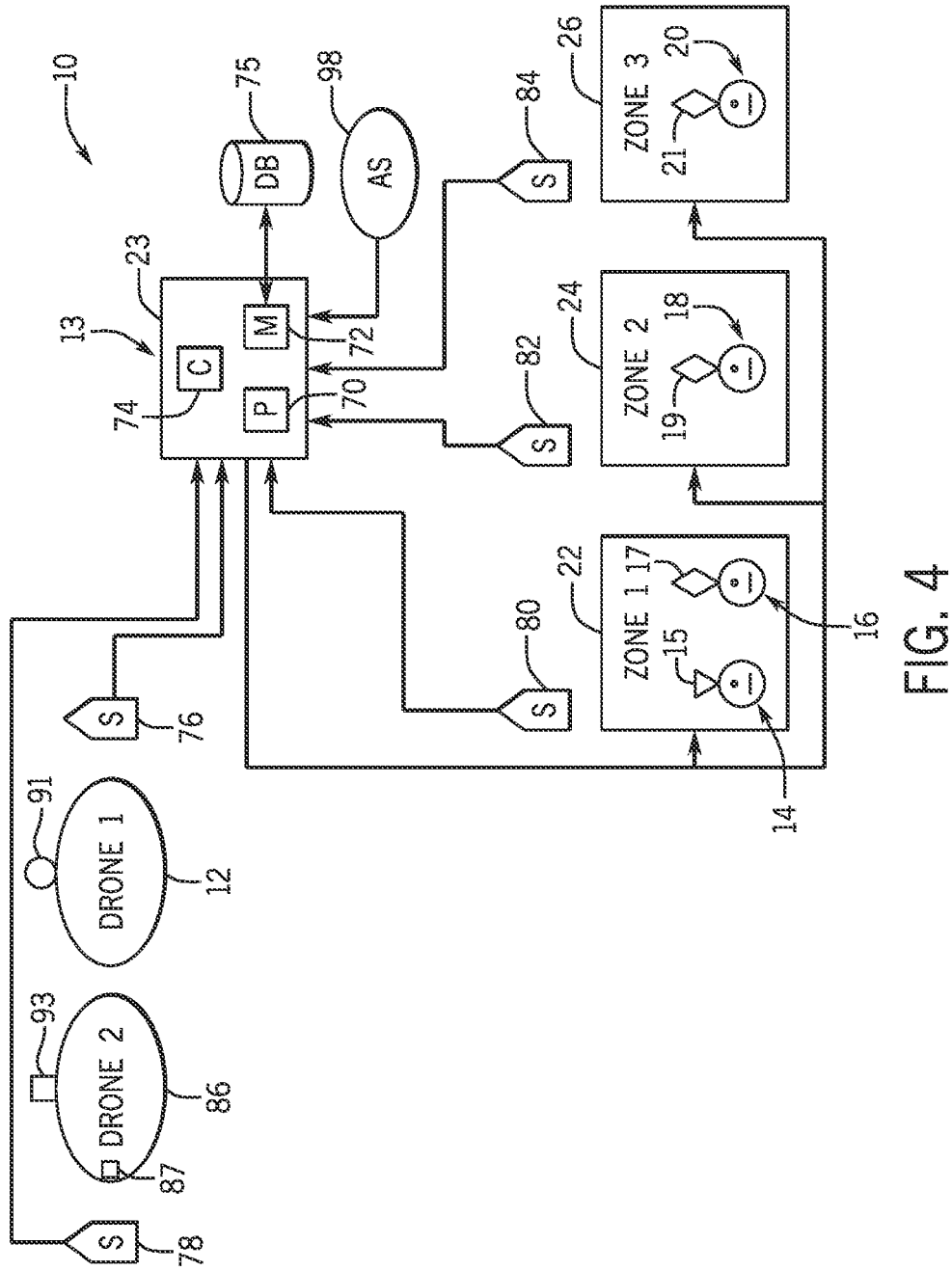
FIG. 4 is a schematic illustration of the interactive drone system of FIG. 1 having a control assembly, in accordance with an aspect of the present disclosure.
Figure 5:
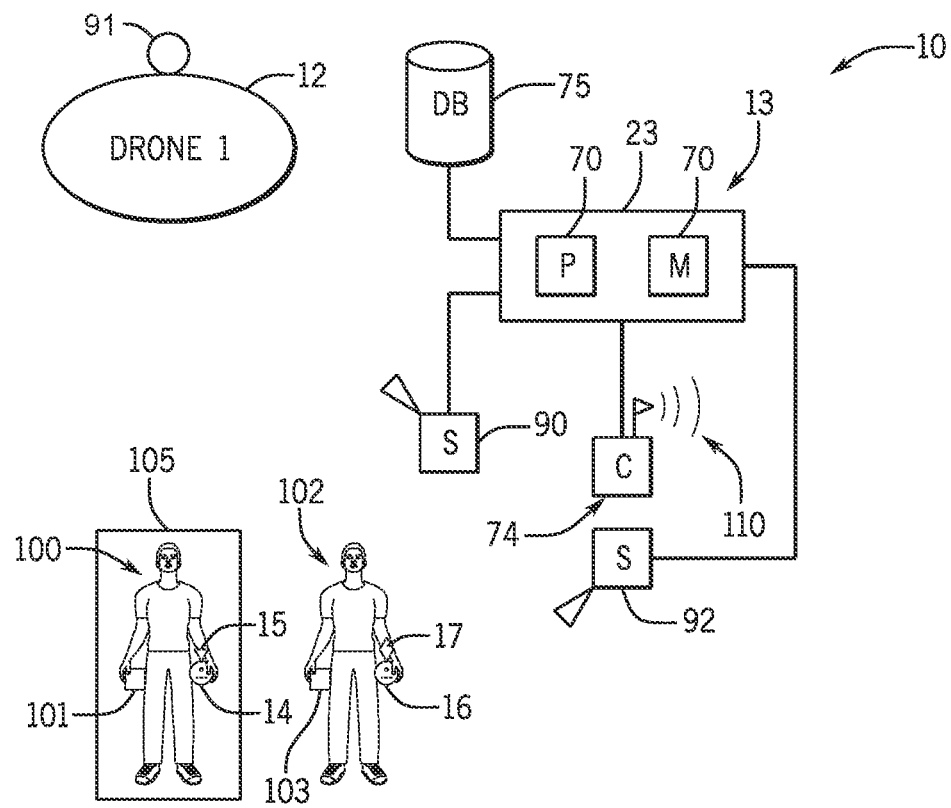
FIG. 5 is a schematic illustration of the interactive drone system of FIG. 1 having a control assembly, in accordance with an aspect of the present disclosure.

In some embodiments, sensor feedback and/or beacons may be a part of, or utilized by, the control assembly 13 to determine the various correlations between the drone 12 and the interactive toy devices 14, 16, 18, 20. That is, the control assembly 13 may include sensors or receive sensor feedback. Of course, as previously described, the control assembly 13 schematically illustrated in FIG. 1 may signify various control components distributed across various components of the system 10. For example, the control assembly 13 may include one or more processors, one or more memories, and one or more sensors, where the one or more processors receive(s) data from the one or more sensors and determines at least a portion of the above-described correlations based on the sensor feedback. Control features of the control assembly 13 and example control distributions are illustrated in FIGS. 3-5 and will be described in detail below.

Figure 3:
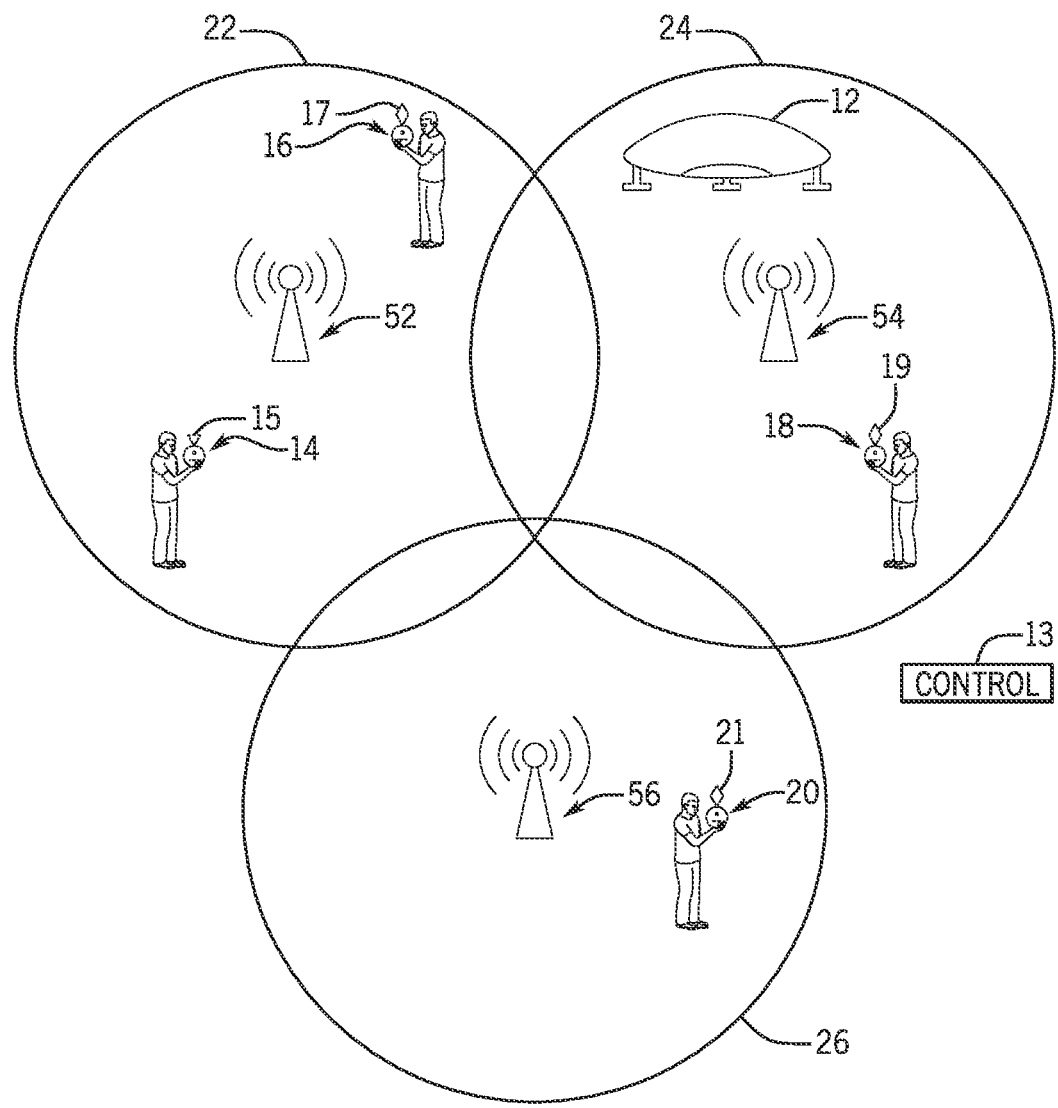
FIG. 3 is a schematic illustration of the interactive drone system of FIG. 1 having a control assembly, in accordance with an aspect of the present disclosure.

FIG. 3 is a schematic illustration of the interactive drone system 10 of FIG. 1 having a control assembly including first, second, and third beacons 52, 54, 56. In the illustrated embodiment, the first beacon 52 corresponds to the first zone 22, the second beacon 54 corresponds to the second zone 24, and the third beacon 56 corresponds to the third zone 26. In some embodiments, the first, second, and third zones 22, 24, 26 are defined by the corresponding signal ranges of the respective first, second, and third beacons 52, 54, 56.

Each of the first, second, and third beacons 52, 54, 56 may be configured to communicate with the interactive toy devices 14, 16, 18, 20, the drone 12, or a combination thereof. In some embodiments, the second beacon 54 may be capable of detecting the drone 12 and/or any of the interactive toy devices 14, 16, 18, 20 within range (e.g., within the corresponding second zone 24), and may be capable of transmitting a communication to the drone 12 and any of the interactive toy devices 14, 16, 18, 20 within range (e.g., within the corresponding first zone 22). In some embodiments, the first, second, and third beacons 52, 54, 56 may not be configured to detect the interactive toy devices 14, 16, 18, 20, but instead will send a signal received by any interactive toy device within range. In the illustrated embodiment, the second beacon 54 may detect the drone 12 within the second zone 24 and the third interactive toy device 18 within the second zone 24. Upon detecting that the third interactive toy device 18 and the drone 12 occupy the same second zone 24, the second beacon 54 may transmit a communication (e.g., wireless communication) to the third interactive toy device 18. The third interactive toy device 18 may receive the communication and, in response to the communication, react in a particular way.

In some embodiments that employ the first, second, and third beacons 52, 54, 56, the first, second, and third beacons 52, 54, 56 may determine at least a portion of the correlation that dictates the particular reaction exhibited by the interactive toy devices 14, 16, 18, 20. In FIG. 3, for example, the second beacon 54 may detect that the third interactive toy device 18 includes the diamond shape 19, and the second beacon 54 may cause, via the above-described communication (e.g., wireless communication), the third interactive toy device 18 to react based on the diamond shape 19. In another embodiment, the second beacon 54 may instruct the third interactive toy device 18 to react, but the third interactive toy device 18 itself (e.g., a processor thereof) at least partially determines the appropriate reaction.

However, it should be noted that multiple drones may be employed and/or a type of drone being employed may be unknown by the interactive toy devices 16, 18, 20, where the type or characteristics of the drone(s) being employed may play a role in determining the type of reaction exhibited by the various interactive toy devices 14, 16, 18, 20. For example, a first reaction of the third interactive toy device 18 may be determined based on a first physical characteristic of the drone 12 paired with the diamond 19 of the third interactive toy device 18, whereas a second reaction of the third interactive toy device 18 may be determined based on a second physical characteristic of the drone 12 paired with the diamond 19 of the interactive toy device 18.

These pairings of physical non-position based characteristics can be determined via the embodiment illustrated in FIG. 3. For example, each of the first, second, and third beacons 52, 54, 56 may be configured to detect a presence of the interactive toy devices 14, 16, 18, 20 within range, to detect a type of the interactive toy devices 14, 16, 18, 20, to detect a presence of the drone 12 (or drones) within range, to detect a type of the drone 12 (or drones), to determine appropriate toy reactions based on the presence and types of the interactive toy devices 14, 16, 18, 20 and the drone 12, and to communicate instructions indicative of the appropriate toy reactions to the interactive toy devices 14, 16, 18, 20. However, other control schemes are also possible.

FIG. 4 is a schematic illustration of an embodiment of the interactive drone system 10 of FIG. 1 having a control assembly, including the control assembly 13. As previously described, the system 10 may include the drone 12 and a number of the interactive toy devices 14, 16, 18, 20. In the illustrated embodiment, the system 10 also includes a second drone 86. The drone 12 and the second drone 86 include distinguishing non-position based physical characteristics. For example, the first drone 12 includes a circular shape 91 attached thereto and the second drone 86 includes a square shape 93 attached thereto. Again, the shapes (e.g., the circular shape 91 and the square shape 93) are representative of any of various different characteristics (e.g., color or association with a group, such as heroes or villains). As previously described, these non-position based physical characteristics of the drones 12, 86 may at least partially dictate how proximate ones of the interactive toy devices 14, 16, 18, 20 react. These and other features are described in detail below.

The control assembly 13 of the system 10 includes one or more controllers 23 having one or more processors 70, one or more memories 72, and communication circuitry 74. Further, the control assembly 13 in the illustrated embodiment includes a database 75 and first, second, third, fourth, and fifth sensors 76, 78, 80, 82, 84. The first sensor 76 may correspond to a first drone 12 of the system 10, the second sensor 78 may correspond to a second drone 86 of the system 10, the third sensor 80 may correspond to a first zone 22 (e.g., of an amusement park 12), the fourth sensor 82 may correspond to a second zone 24 (e.g., of the amusement park 12), and the fifth sensor 84 may correspond to a third zone 26 (e.g., of the amusement park 12). The first, second, third, fourth, and fifth sensors 76, 78, 80, 82, 84 may be configured to monitor hardware associated therewith. That is, the first and second sensors 76, 78 may monitor the locations of the drones 12, 86, while the third, fourth, and fifth sensors 80, 82, 84 may monitor locations of the various devices disposed on ground-level in the first, second, and third zones 22, 24, 26 (e.g., the third sensor 80 monitors the locations of the first and second interactive toy devices 14, 16, the fourth sensor 82 monitors the location of the third interactive toy device 18, and the fifth sensor 84 monitors the location of the fourth interactive toy device 20). In accordance with present embodiments, more or fewer sensors may be employed. For example, each interactive toy device 14, 16, 18, 20 may include a dedicated sensor or sensors. Further, a single sensor may monitor the locations of the two drones 12, 86. It should be noted that the first, second, third, fourth, and fifth sensors 76, 78, 80, 82, 84 may include any suitable type of sensor, such as a camera, an infrared (IR) sensor, or the like.

The controller(s) 23 may receive data from one or more of the first, second, third, fourth, or fifth sensors 76, 78, 80, 82, 84 and utilize the data to determine the locations of the drones 12, 86 and devices 14, 16, 18, 20 and a relative proximity between each drone 12, 86 and each interactive toy device 14, 16, 18, 20. As described with respect to FIGS. 1 and 2, the sensor feedback may be considered by the controller(s) 23 in determining when and how each interactive toy device 14, 16, 18, 20 reacts. For example, the memory 72 may include instructions stored thereon that, when executed by the processor 70, causes the processor 70 to determine the correlations utilized by the controller(s) 23 to instruct various reactions of the interactive toy devices 14, 16, 18, 20. The communication circuitry 74 of each controller 23 may be configured to send communications (e.g., reaction instructions) to each of the interactive toy devices 14, 16, 18, 20.

As previously described, the first, second, third, fourth, and fifth sensors 78, 76, 80, 82, 84 (and/or other sensors), or feedback therefrom, may also be utilized to determine non-position based physical characteristics of the various drones 12, 86 and/or interactive toy devices 14, 16, 18, 20. However, in some embodiments, the non-position based physical characteristics may be correlated with identifiers of the interactive toy devices 14, 16, 18, 20 stored to the one or more memories 72 of the one or more controllers 23. That is, the control assembly 13 may determine the non-position based physical characteristics without detecting the non-position based physical characteristics themselves, but instead by merely detecting a presence of the drones 12, 86 and/or interactive toy devices 14, 16, 18, 20 and consulting a reference table (e.g., stored to the memory 72) indicating the non-position based physical characteristics and/or the appropriate correlation-based reactions. In some embodiments, the presence of the drones 12, 86 and/or interactive toy devices 14, 16, 18, 20 may be detected via a physical identifying feature (e.g., an RFID tag, a QR code, a barcode, a physical symbol, an alphanumeric character, etc.) disposed on or in the drones 12, 86 and/or interactive toy devices 14, 16, 18, 20. For example, the second drone 86 includes a physical identifying feature 87 which may correspond to an RFID tag or chip, a QR code, a barcode, an alphanumeric character, or any other suitable identifier, where the physical identifying feature 87 indicates that the second drone 86 is of the type including the square 93 feature. After identifying the interactive toy device(s) 14, 16, 18, 20 based on the above-described identifier(s), the controller(s) 23 may consult the reference table stored in the memory 72 to determine the non-position based physical characteristics (e.g., aesthetic or functional characteristics) associated with the identifier(s).

In some embodiments, a database 75 of the control assembly 13 may be employed to store certain of the above-described data (e.g., the reference table[s]), and may communicate relevant data to the processor 70 or memory 72 when needed to determine the appropriate reactions of the interactive toy devices 14, 16, 18, 20. Further, in some embodiments, an ambient sensor 98 may be employed, and the correlations between the drones 12, 86 and the interactive toy devices 14, 16, 18, 20 (and subsequent reactions of the interactive toy devices 14, 16, 18, 20) may depend in part on these ambient conditions. For example, the ambient sensor 98 may communicate data indicative of ambient conditions (e.g., ambient weather, ambient temperature, ambient brightness, guest concentration throughout various zones of the park). In some embodiments, ambient conditions (e.g., weather conditions) may be scrubbed by the controller(s) 23 from a weather broadcasting service. Based on the position based characteristics (e.g., proximity and location) and non-position based physical characteristics (e.g., size, shape, color, character, or face) of the drones 12, 86 and the interactive toy devices 14, 16, 18, 20, the controller(s) 23 may determine when and how each of the interactive toy devices 14, 16, 18, 20 reacts.

As previously described, it should be understood that the controller(s) 23 may be separate from the drones 12, 86 and the interactive toy devices 14, 16, 18, 20, or may reside in whole or in part on the drones 12, 86 and the interactive toy devices 14, 16, 18, 20. Further, the processor 70, the memory 72, and the communication circuitry 74 may be divided into multiple processors 70, memories 72, and communication circuitries 74 separate from, or integral with, the drones 12, 86 and the interactive toy devices 14, 16, 18, 20. In general, the control assembly 13 and corresponding controller(s) 23 operate to determine correlations between the drone 12 and the interactive toy devices 14, 16, 18, 20 and between the drone 86 and the interactive toy devices 14, 16, 18, 20, and to instruct the interactive toy devices 14, 16, 18, 20 to cause correlation-based reactions.

FIG. 5 is a schematic illustration of another embodiment of the interactive drone system 10 of FIG. 1 having the control assembly 13. In the illustrated embodiment, a first guest 100 is positioned within a barrier 105. The first guest 100 has on his person the first interactive toy device 14 and a first additional handheld device 101, such as a cell phone or other customer interface device. A second guest 102 is positioned outside of the barrier 105. The second guest 102 has on her person the second interactive toy device 16 and a second handheld device 103, such as a cell phone or other customer interface device. The control assembly 13 includes first and second cameras 90, 92. The first camera 90 monitors the drone 12 and the second camera 92 monitors the first interactive toy device 14 and the second interactive toy device 16. The controller(s) 23 control assembly 13 also includes at least one processor 70, at least one memory 72, and communication circuitry 74. In the illustrated embodiment, the communication circuitry 74 includes a wireless transmitter 110 configured to transmit instructions to the first interactive toy device 14 and the second interactive toy device 16 (e.g., to control reactions thereof).

In accordance with the present disclosure, the control assembly 13 may be capable of incentivizing the first and second guests 100, 102 to act in a way that enables the corresponding first and second interactive toy device 14, 16 to react in accordance with the previous discussion regarding correlations between the first and second interactive toy devices 14, 16 and the drone 12. For example, in the illustrated embodiment, the second camera 92 may not be able to see the first interactive toy device 14 because the first guest 100 is positioned within the barrier 105. However, the control assembly 13 may be aware of the presence of the first interactive toy device 14 via other means (e.g., RFID tracking or geolocation sensors). Further, the first guest 100 may be incapable of seeing the drone 12 while the first guest 100 is within the barrier 105. Accordingly, the control assembly 13 (e.g., via the wireless transmitter 110) may request that the first guest 100 exit the physical barrier 105 such that the first guest 100 can see the drone 12 and/or such that the second camera 92 can see the first interactive toy device 14.

The above-described request may be sent by the wireless transmitter 110 to a communication interface of the first handheld device 101 or of the first interactive toy device 14. If the first guest 100 complies with the request and exits the physical barrier 105, the second camera 92 may see the first interactive toy device 14 and alert the processor 70. That is, the control assembly 13 may determine and/or establish a line-of-sight between the first interactive toy device 14 and the drone 12 by way of the above-described control features. In response to the alert, the processor 70 may cause the wireless transmitter 110 to instruct the first interactive toy device 14 to react in accordance with the aforementioned correlation calculation (e.g., the correlation between the first interactive toy device 14 and the drone 12). By incentivizing the first guest 100 to leave the physical barrier 105 such that the first guest 100 can see the drone 12, and by initiating the reaction of the first interactive toy device 14 only after the second camera 92 sees the first interactive toy device 14, the first guest 100 may better understand why the first interactive toy device 14 reacts a particular way (e.g., based on the above-described correlation), thereby improving the immersive guest experience. In other words, the above-described scheme enables the first guest 100 to observe the drone 12 as the first interactive toy device 14 reacts, thus contextualizing to the first guest 100 the reason(s) for the reaction.

The above-described incentivizing scheme may be employed via any of the embodiments illustrated in FIGS. 3-5. For example, cameras may not be required to enable the above-described incentive. In one embodiment, wireless signals sent by the first, second, and third beacons 52, 54, 56 in FIG. 3, for example, may be blocked by physical barriers such as the barrier 105 in FIG. 5. However, positions of the interactive toy devices 14, 16, 18, 20 may still be monitored. For example, the interactive toy devices 14, 16, 18, 20 may be equipped with position trackers, such as a Global Positioning (GPS) trackers, the signals of which are not blocked by the barrier 105. Thus, while the presence or locations of the interactive toy devices 14, 16, 18, 20 are known, the interactive toy devices 14, 16, 18, 20 may not receive a signal from the corresponding beacons 52, 54, 56 if the interactive toy devices 14, 16, 18, 20 are blocked by the barrier 105 or some other barrier. This condition, when detected, may trigger a communication to guests (e.g., the first guest 100 in FIG. 5) to move away from the physical barrier 105. In some embodiments, said communication may be sent to the first guest 100 (i.e., a CID 101 of the first guest 100) via the interactive toy device itself, or via a communication component capable of communicating a signal through the physical barrier 105.

Figure 6:
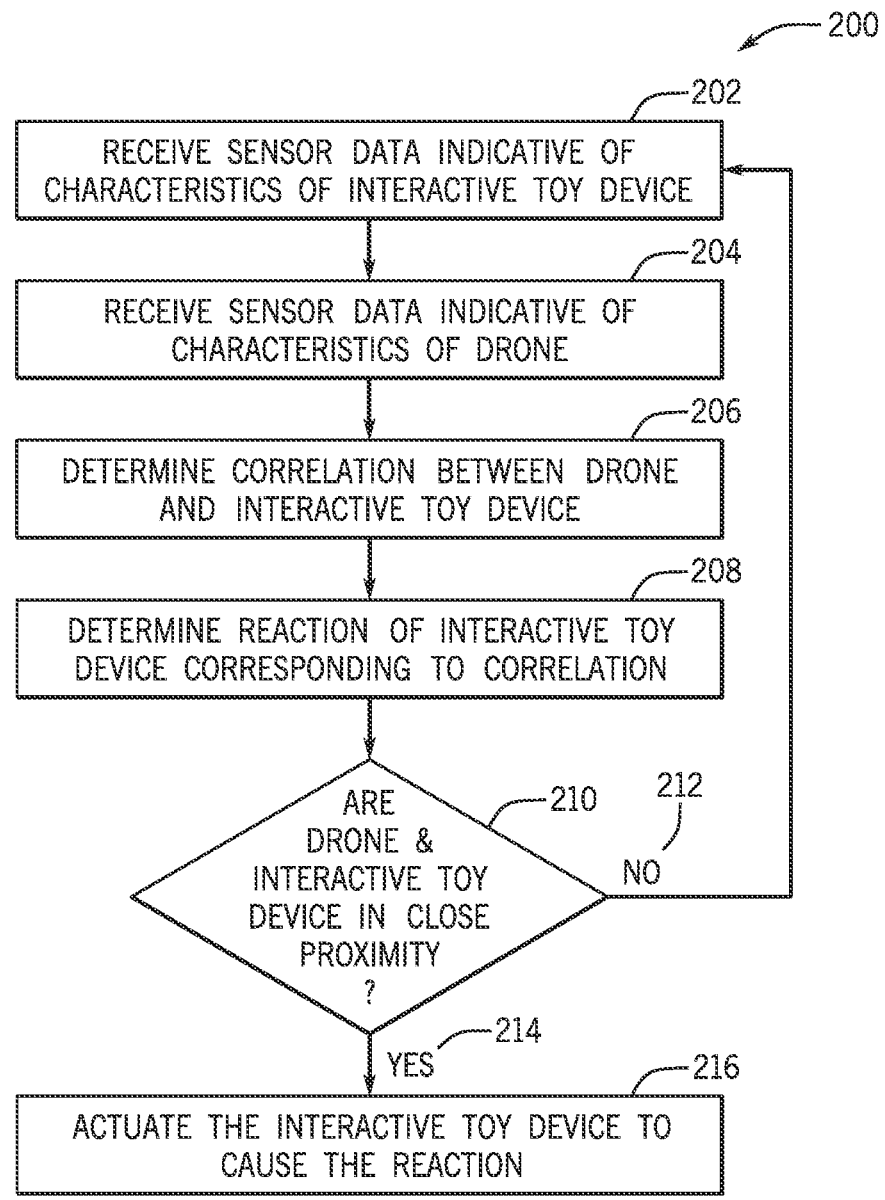
FIG. 6 is a process flow diagram illustrating a method of operating the interactive drone system of FIG. 1, in accordance with an aspect of the present disclosure.

FIG. 6 is a process flow diagram illustrating an embodiment of a method 200 of operating the interactive drone system of FIG. 1. In the illustrated embodiment, the method 200 includes receiving (block 202) sensor data indicative of characteristics of an interactive toy device. For example, the characteristics may include position based and non-position based characteristics. The position based characteristics may include, for example, a location of the interactive toy device in a particular zone of the amusement park. The non-position based characteristics may include, for example, a color of the interactive toy device, a shape of the interactive toy device, a size of the interactive toy device, a face of the interactive toy device, a character of the interactive toy device in a story, and other features. As previously described, in some embodiments, the interactive toy device may include a physical identifier, such as a barcode, an alphanumeric identifier, a QR code, or an RFID tag or chip. The identifier may indicate the non-position based physical characteristics of the interactive toy device. That is, a controller receiving the sensor data indicative of the characteristics of the interactive toy device may confirm the non-position based physical characteristics based on detection of the physical identifier.

The method 200 also includes receiving (block 204) sensor data indicative of characteristics of a drone. For example, the characteristics may include position based and non-position based characteristics. The position based characteristics may include, for example, a location of the drone in a particular zone of the amusement park. The non-position based characteristics may include, for example, a color of the drone, a shape of the drone, a size of the drone, a face of the drone, a team affiliation, a character of the drone in a story, and other features. As previously described, in some embodiments, the drone may include a physical identifier, such as a barcode, an alphanumeric identifier, a QR code, or an RFID tag or chip. The identifier may indicate the non-position based physical characteristics of the interactive toy device. That is, a controller receiving the sensor data indicative of the characteristics of the interactive toy device may confirm the non-position based physical characteristics based on detection of the physical identifier.

The method 200 also includes determining (block 206) a correlation between the drone and the interactive toy device. For example, the method 200 may include determining that the drone is blue and the interactive toy device is red, and that the drone and the interactive toy device reside is in a first zone of the amusement park. The method 200 also includes determining (block 208) a reaction of the interactive toy device corresponding to the correlation. For example, the above-described correlation may correspond to a smiling reaction, whereas a different correlation may correspond to a frowning reaction.

The method 200 also includes determining (block 210) whether the interactive toy device is in close proximity with the drone. In some embodiments, the proximity may be considered a part of the correlation. Proximity may be determined based on a comparison of the location of the drone and the location of the interactive toy device. In one embodiment, a distance between the drone and the interactive toy device may be determined, and "close proximity" may be determined based on the distance being less than a proximity threshold. In another embodiment, "close proximity" may be determined based on the interactive toy device and the drone residing in the same zone of the amusement park. If the drone and the interactive toy device are not in close proximity (block 212), the method 200 begins again at block 202. If the drone and the interactive toy device are in close proximity (block 214), the method 200 includes actuating (block 216) the interactive toy device to cause the reaction determined at block 208.

Figures 7, 8:
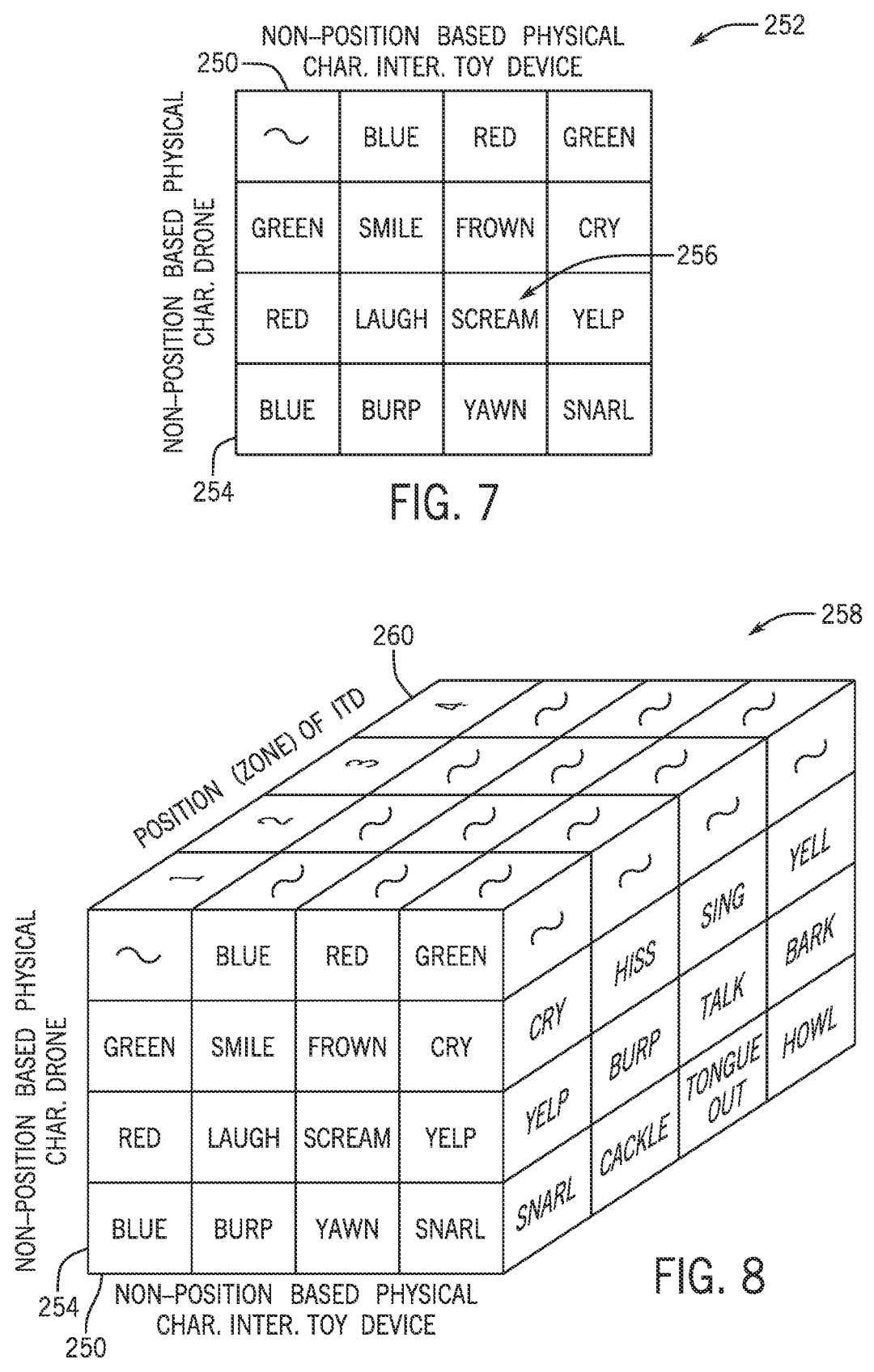

As previously noted, the present disclosure includes determining a correlation between a drone and an interactive toy device, and causing a reaction of the interactive toy device based on the correlation. The correlation may include a number of factors (e.g., two, three, four, or more factors). FIG. 7 is a schematic illustration of an embodiment of control decisions for a control assembly of the interactive drone system of FIG. 1, whereby a correlation between the drone and the interactive toy device includes at least two factors. For example, an X-axis 250 of the illustrated control plot 252 corresponds to a non-position based physical characteristic (e.g., color) of the interactive toy device, including blue, red, and green. A Y-axis 254 of the illustrated control plot 252 corresponds to a non-position based physical characteristic (e.g., color) of the drone, including blue, red, and green. In an embodiment where a red interactive toy device comes into close proximity with a red drone, the correlation illustrated in the control plot 252 corresponds to a screaming reaction 256 of the interactive toy device. As illustrated, other reactions corresponding to other correlations are also possible.

FIG. 8 is a schematic illustration of an embodiment of control decisions for a control assembly of the interactive drone system of FIG. 1, whereby a correlation between the drone and the interactive toy device includes at least three factors. For example, the X-axis 250 and the Y-axis 254 in the control plot 258 of FIG. 8 is the same as the X-axis 250 and the Y-axis 254 in the control plot 252 of FIG. 7. However, in FIG. 8, a Z-axis 260 corresponds to the position (or zone) in which the interactive toy device resides. Thus, a color of the drone, a color of the interactive toy device, and a zone in which the interactive toy device resides may all be factors of the correlation for determining a corresponding reaction of the interactive toy device.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An entertainment system, comprising:
   a drone configured to be maneuvered across a plurality of zones;
   an interactive toy device configured to be actuated to cause a plurality of toy reactions;
   one or more processors; and
   one or more non-transitory, computer readable media having instructions stored thereon that, when executed by the one or more processors, cause the one or more processors to:
      determine a correlation between the drone and the interactive toy device, wherein the correlation is based on a proximity between the drone and the interactive toy device and at least one of:
         a location of the drone within a zone of the plurality of zones;
         an additional location of the interactive toy device within the zone or an additional zone of the plurality of zones;
         a non-position based physical attribute of the drone; or
         an additional non-position based physical attribute of the interactive toy device; and
      activate, based on the correlation, a toy reaction of the plurality of toy reactions.

2. The entertainment system of claim 1, comprising one or more sensors configured to detect the location of the drone and the additional location of the interactive toy device, wherein the instructions, when executed by the one or more processors, cause the one or more processors to determine, based on sensor feedback from the one or more sensors indicative of the location and the additional location, the proximity between the drone and the interactive toy device.

3. The entertainment system of claim 1, wherein the instructions, when executed by the one or more processors, cause the one or more processors to actuate the interactive toy device to cause the toy reaction in response to determining that the proximity is less than a proximity threshold.

4. The entertainment system of claim 1, wherein the instructions, when executed by the one or more processors, cause the one or more processors to determine the correlation based on a relation between the non-position based physical attribute of the drone and the additional non-position based physical attribute of the interactive toy device.

5. The entertainment system of claim 1, wherein the non-position based physical attribute of the drone comprises a color of the drone, a size of the drone, or a shape of the drone, and wherein the additional non-position based physical attribute of the interactive toy device comprises a color of the interactive toy device, a size of the interactive toy device, or a shape of the interactive toy device.

6. The entertainment system of claim 1, wherein the instructions, when executed by the one or more processors, cause the one or more processors to select, based on the correlation and an ambient condition, the toy reaction of the plurality of toy reactions.

7. The entertainment system of claim 6, comprising at least one sensor configured to detect the ambient condition, wherein the ambient condition comprises an ambient temperature, an ambient brightness, or an ambient weather condition.

8. The entertainment system of claim 1, comprising an additional interactive toy device separate from the interactive toy device, wherein the instructions, when executed by the one or more processors, cause the one or more processors to:
   determine an additional correlation between the drone and the additional interactive toy device, wherein the additional correlation is based on an additional proximity between the drone and the additional interactive toy device and:
      the location of the drone within the zone of the plurality of zones;
      a third location of the additional interactive toy device within the zone, the additional zone, or a third zone of the plurality of zones;
      the non-position based physical attribute of the drone; or
      a third non-position based physical attribute of the additional interactive toy device; and
   activate, based on the additional correlation, an additional toy reaction of the plurality or toy reactions, wherein the additional toy reaction is different than the toy reaction.

9. The entertainment system of claim 8, wherein the instructions, when executed by the one or more processors, cause the one or more processors to actuate the interactive toy device to cause the toy reaction and the additional interactive toy device to cause the additional toy reaction at a single moment in time.

10. The entertainment system of claim 1, comprising a wireless transmitter in wireless communication with the interactive toy device and configured to instruct, based on the correlation, the interactive toy device to actuate to cause the toy reaction.

11. The entertainment system of claim 1, comprising an additional drone configured to be maneuvered across the plurality of zones, wherein the instructions, when executed by the one or more processors, cause the one or more processors to:

determine an additional correlation between the additional drone and the interactive toy device, wherein the additional correlation is based on an additional proximity between the additional drone and the interactive toy device and:
   a second location of the additional drone within the zone, the additional zone, or a third zone of the plurality of zones;
   the additional location of the interactive toy device;
   a second non-position based physical attribute of the drone; or
   the additional non-position based physical attribute of the interactive toy device; and
activate, based on the additional correlation, an additional toy reaction of the plurality of toy reactions, the additional toy reaction differing from the toy reaction.

12. An interactive drone system, comprising:
a drone;
a plurality of interactive toy devices; and
a beacon having a transmitter with a signal transmission range, wherein the beacon is configured to:
   determine a presence of the drone; and
   transmit, in response to determining the presence of the drone, a signal over the signal transmission range and receivable by the plurality of interactive toy devices, wherein a first interactive toy device of the plurality of interactive toy devices is configured to:
     receive the signal; and
     actuate, in response to receiving the signal, to cause a first toy reaction of a plurality of toy reactions, wherein the first toy reaction is based on a correlation between the first interactive toy device and the drone.

13. The interactive drone system of claim 12, comprising an additional beacon having an additional transmitter with an additional signal transmission range, wherein the additional beacon is configured to:
   determine an additional presence of the drone; and
   transmit, in response to determining the additional presence of the drone, an additional signal over the additional signal transmission range and receivable by the plurality of interactive toy devices, wherein the first interactive toy device of the plurality of interactive toy devices is configured to:
     receive the additional signal; and
     actuate, in response to receiving the additional signal, to cause a second toy reaction of the plurality of toy reactions, wherein the second toy reaction is based on an additional correlation between the first interactive toy device and the drone and is different than the first toy reaction.

14. The interactive drone system of claim 12, wherein the correlation comprises a non-position based physical attribute of the first interactive toy device and an additional non-position based physical attribute of the drone.

15. The interactive drone system of claim 12, comprising the first interactive toy device and a second interactive toy device of the plurality of interactive toy devices, wherein the second interactive toy device is configured to:
   receive the signal; and
   actuate, in response to receiving the signal, to cause a second toy reaction of the plurality of toy reactions, wherein the second toy reaction is based on an additional correlation between the second interactive toy device and the drone, and wherein the second toy reaction is different than the first toy reaction.

16. The interactive drone system of claim 12, comprising an additional drone, wherein the beacon is configured to:
   determine an additional presence of the additional drone; and
   transmit, in response to determining the additional presence of the additional drone, an additional signal over the signal transmission range and receivable by the plurality of interactive toy devices, wherein the first interactive toy device of the plurality of interactive toy devices is configured to:
   receive the additional signal; and
   actuate, in response to receiving the additional signal, to cause a second toy reaction of a plurality of toy reactions, wherein the second toy reaction is based on an additional correlation between the first interactive toy device and the additional drone.

17. An entertainment system having one or more processors and one or more non-transitory, computer readable media storing instructions thereon that, when executed by the one or more processors of the entertainment system, cause the one or more processors to:
   determine a first location of a first interactive toy device;
   determine a second location of a second interactive toy device;
   determine a third location of a drone;
   determine, based on the first location and the third location, a first proximity between the first interactive toy device and the drone;
   actuate, in response to determining that the first proximity is less than a proximity threshold, the first interactive toy device to cause a first toy reaction of a first plurality of toy reactions, each toy reaction of the first plurality of toy reactions corresponding to a relation between a first non-position based physical attribute of the first interactive toy device and an additional non-position based physical attribute of the drone;
   determine, based on the second location and the third location, a second proximity between the second interactive toy device and the drone; and
   in response to determining that the second proximity is less than the proximity threshold, actuate the second interactive toy device to cause a second toy reaction of a second plurality of toy reactions, each toy reaction of the second plurality of toy reactions corresponding to a relation between a second non-position based physical attribute of the second interactive toy device and the additional non-position based physical attribute of the drone.

18. The entertainment system of claim 17, wherein the first plurality of toy reactions is the same as the second plurality of toy reactions, and wherein the first toy reaction differs from the second toy reaction.

19. The entertainment system of claim 17, wherein:
   the first non-position based physical attribute comprises a first color of the first interactive toy device, a first shape of the first interactive toy device, or a first size of the first interactive toy device;
   the second non-position based physical attribute comprises a second color of the second interactive toy device, a second shape of the second interactive toy device, or a second size of the second interactive toy device;
   the additional non-position based physical attribute comprises an additional color of the drone, an additional shape of the drone, or an additional size of the drone; or
   any combination thereof.

20. The entertainment system of claim 17, wherein the instructions, when executed by the one or more processors, cause the one or more processors to:
   determine a line-of-sight between the drone and the first interactive toy device; and
   actuate, in response to determining that the line-of-sight is not blocked, the first interactive toy device to cause the first toy reaction of the first plurality of toy reactions.

\* \* \* \* \*